(12) United States Patent  
Bober et al.

(10) Patent No.: US 11,005,309 B2
(45) Date of Patent: May 11, 2021

(54) CHARGING APPARATUS WITH LOCATOR

(71) Applicants: Wieslaw Bober, Astoria, NY (US); Kamil Sienkiel, Wegrzce (PL); Dominik Stanislaw Sienkiel, Ostrowiec Swietokrzyski (PL)

(72) Inventors: Wieslaw Bober, Astoria, NY (US); Kamil Sienkiel, Wegrzce (PL); Dominik Stanislaw Sienkiel, Ostrowiec Swietokrzyski (PL)

(73) Assignee: WBTEC, LLC, Hopewell Junction, NY (US)

(*) Notice: Subject to any disclaimer, the term of this patent is extended or adjusted under 35 U.S.C. 154(b) by 0 days.

(21) Appl. No.: 16/186,045

(22) Filed: Nov. 9, 2018

(65) Prior Publication Data
US 2019/0238007 A1   Aug. 1, 2019

Related U.S. Application Data

(60) Provisional application No. 62/645,591, filed on Mar. 20, 2018, provisional application No. 62/622,592, filed on Jan. 26, 2018.

(51) Int. Cl.
| | | |
|---|---|---|
| *H02J 7/02* | (2016.01) | |
| *H02J 50/90* | (2016.01) | |
| *H02K 7/14* | (2006.01) | |
| *H02J 7/00* | (2006.01) | |

(52) U.S. Cl.
CPC ............... *H02J 50/90* (2016.02); *H02J 7/00* (2013.01); *H02J 7/025* (2013.01); *H02K 7/14* (2013.01)

(58) Field of Classification Search
CPC .................................................. H02J 7/025
USPC ........................................................ 320/108
See application file for complete search history.

(56) References Cited

U.S. PATENT DOCUMENTS

| | | | |
|---|---|---|---|
| 2009/0153098 A1* | 6/2009 | Toya ............... | H02J 50/60 320/108 |
| 2011/0074344 A1 | 3/2011 | Park et al. | |
| 2015/0188356 A1 | 7/2015 | Chen et al. | |
| 2016/0355097 A1 | 12/2016 | Konet et al. | |
| 2017/0033588 A1 | 2/2017 | Wu et al. | |
| 2018/0198313 A1* | 7/2018 | Lee ............... | H02J 7/025 |

FOREIGN PATENT DOCUMENTS

KR    10-2016-0135939    11/2016

OTHER PUBLICATIONS

International Search Report dated May 15, 2019 issued in counterpart application No. PCT/US2019/015451, 11 pages.

* cited by examiner

*Primary Examiner* — Edward Tso
*Assistant Examiner* — Ahmed H Omar
(74) *Attorney, Agent, or Firm* — The Farrell Law Firm, P.C.

(57) ABSTRACT

A charging device is provided. The charging device includes a wireless base; a wireless charging coil attached to the wireless base; and a controller integrated circuit (IC) connected to the wireless charging coil, wherein the wireless base is configured to move from a first position inside the charging device to a second position inside the charging device.

20 Claims, 8 Drawing Sheets

CHARGING APPARATUS WITH LOCATOR

PRIORITY

This application is based on and claims priority under 35 U.S.C. § 119 to U.S. Provisional Application No. 62/645,591, filed on Mar. 20, 2018, in the United States Patent and Trademark Office and U.S. Provisional Application No. 62/622,592, filed on Jan. 26, 2018, in the United States Patent and Trademark Office, the disclosures of which are incorporated herein by reference in their entirety.

BACKGROUND

1. Field of the Disclosure

The present disclosure relates generally to charging electronic devices, and more particularly, using furniture to charge electronic devices.

2. Description of the Related Art

In recent years, the use of electronic devices has increased. In particular, electronic devices that hold a charge and use a battery are commonplace in today's society. Some electronic devices, such as mobile phones, for example, may be used extensively and can require charging throughout the day.

Locating fast, reliable, and available charging solutions has become problematic as the number of portable electronic devices has increased in recent years.

Typically, electronic device users must charge the batteries of their devices by using a wall charger connected to an external power supply. Alternatively, some electronic devices may be charged wirelessly.

Wireless charging is advantageous for users because of its convenience. User's may place their electronic device in a wireless charging area (i.e., on a pad) to begin charging their device without being required to plug in their devices, as is the case with wall chargers and other traditional charging mechanisms.

Wireless chargers are limited, however, by requiring an electronic device to be placed in a particular area for charging to occur. Often times, the area for charging is small and the user must be cautious in placing an electronic device in the proper location for charging.

SUMMARY

The present disclosure has been made to address at least the above-mentioned problems and/or disadvantages and provide at least the advantages described below.

An aspect of the present disclosure is directed to a charging device including a wireless base; a wireless charging coil attached to the wireless base; and a controller integrated circuit (IC) connected to the wireless charging coil, wherein the wireless base is configured to move from a first position inside the charging device to a second position inside the charging device.

Another aspect of the present disclosure provides a charging device including a wireless base; a wireless charging coil attached to the wireless base; a controller IC connected to the wireless charging coil; a first set of sliders positioned in a horizontal direction; and a second set of sliders positioned in a vertical direction and connected to bearings that form a movable joint along the first set of sliders, wherein the wireless base is configured to move along at least one of the first set of sliders and the second set of sliders from a first position inside the charging device to a second position inside the charging device.

According to an aspect of the present disclosure, a charging device includes a wireless base; a wireless charging coil attached to the wireless base; a controller IC connected to the wireless charging coil; a rotor bearing positioned at a center portion of the charging device; a radial arm extending from an outer edge of the charging device to the center portion of the charging device; and a rotate motor configured to rotate the radial arm 360 degrees about the center portion of the charging device, wherein the wireless base is configured to move from a first position inside the charging device to a second position inside the charging device.

BRIEF DESCRIPTION OF THE DRAWINGS

Various aspects, features and advantages of the present disclosure will become more apparent from the following detailed description when taken in conjunction with the accompanying drawings, in which.

DETAILED DESCRIPTION

Embodiments of the present disclosure are directed to providing a charger for an electronic device, and are described in detail with reference to the accompanying drawings. Detailed descriptions of constructions or processes known in the art may be omitted to avoid obscuring the subject matter of the present disclosure.

The same numbering is used to correspond to similar elements appearing in multiple figures. The descriptions of similar elements are omitted when those elements have already been described with respect to a previous figure.

Figure 1:
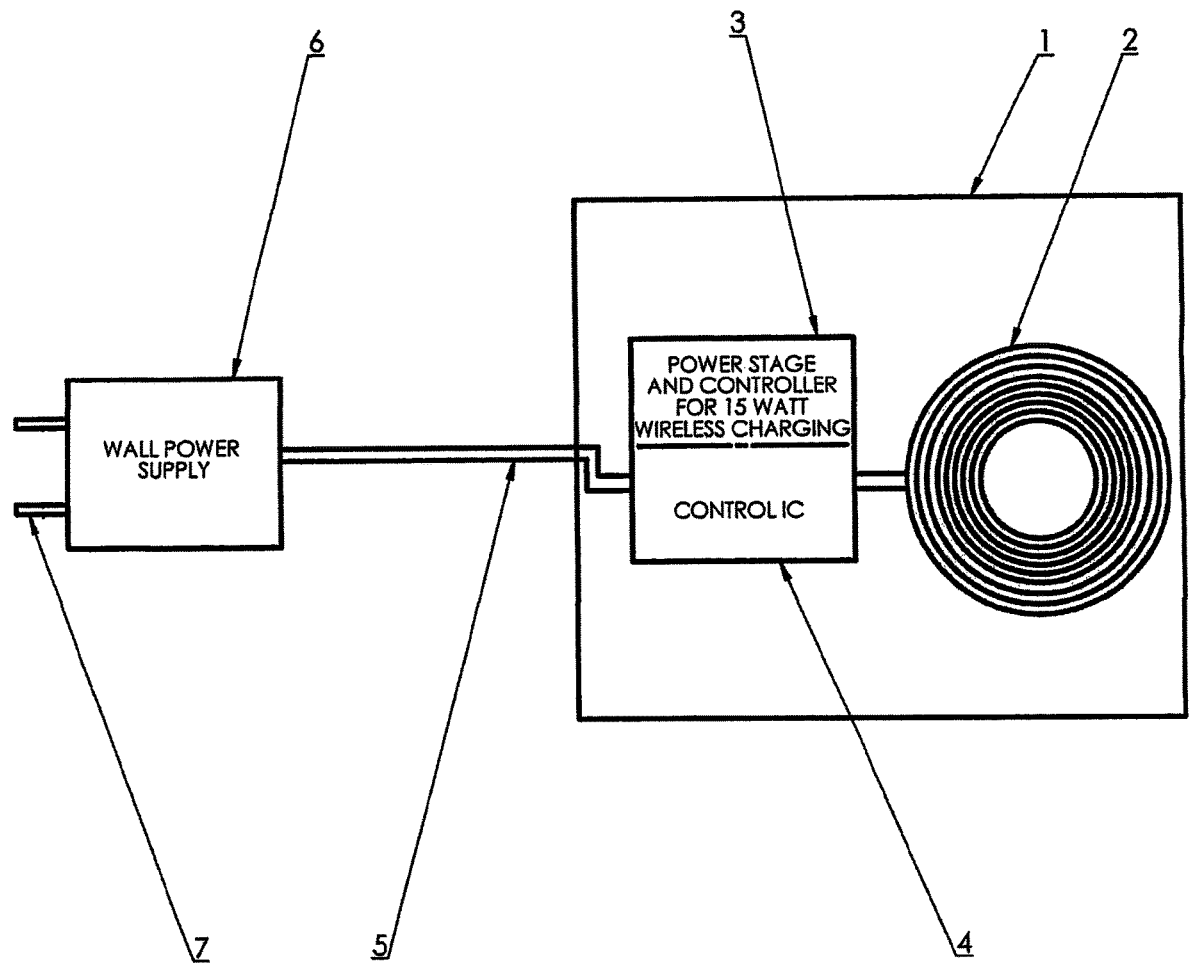
FIG. 1 shows a diagram illustrating a stationary charging coil without a universal serial bus (USB) port, according to an embodiment of the present disclosure.

Referring initially to FIG. 1, a diagram is provided that illustrates a stationary charging coil without a USB port, according to an embodiment of the present disclosure.

The stationary charging coil without a USB port shown in FIG. 1 includes a case 1 that houses a coil 2, a power stage/controller 3, and a control IC. The case 1 may be embedded within and appear as a part of a larger object, such as a part of furniture (i.e., a top of a nightstand, a top of a coffee table, or an arm of a couch).

The coil 2 is connected to the power stage/controller 3 and control IC 4. The coil 2 provides particular frequency characteristics capable of wirelessly transmitting a charge to an external electronic device through electromagnetic induction or resonance. The external electronic device may be positioned in the vicinity of the coil 2 to receive a charge. For example, the external electronic device may be located outside of the housing 1 to receive a wireless charge.

The power stage/controller 3 and control IC 4 are attached to a power wire 5 to connect the coil 2 to the wall power supply 6. The power stage/controller 3 may support 15 watt wireless charging by supplying a predetermined current to the coil 2 based on frequency characteristics of the coil 2. The control IC 4 may control the operations of the power stage/controller 3.

Wall power supply 6 connects the power wire 5 to the high voltage pin 7. The high voltage pin 7 may be inserted into a wall socket for inputting power into the wall power supply 6.

Alternatively, the wall power supply may be replaced with a rechargeable battery that is positioned within the case 1. That is, the rechargeable battery may be recharged by a wall power supply 6 and provide power to the coil 2.

Figure 2:
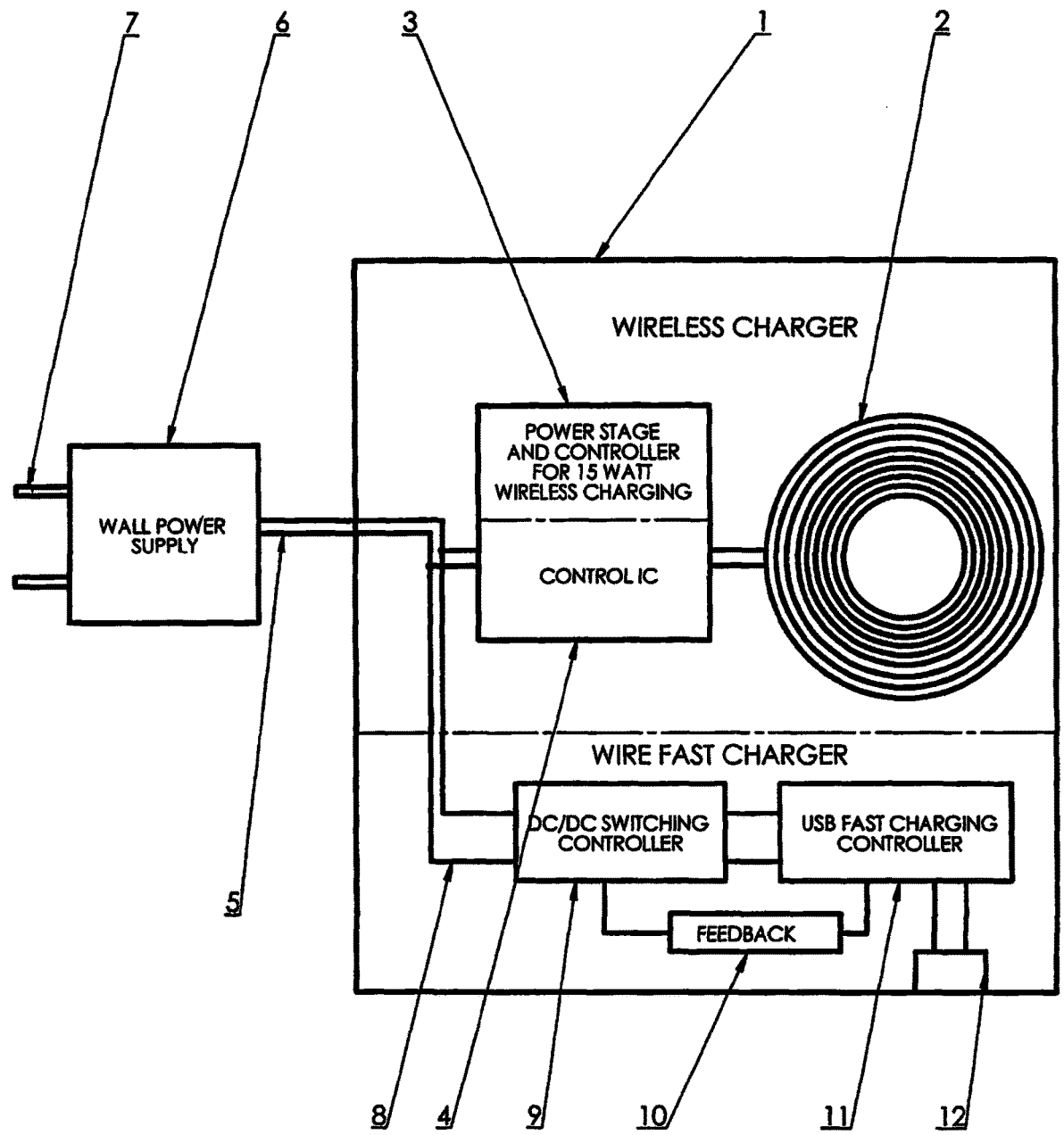
FIG. 2 shows a diagram illustrating a stationary charging coil with an internal USB port, according to an embodiment of the present disclosure.

Referring to FIG. 2, a diagram is provided that illustrates a stationary charging coil with an internal USB port, according to an embodiment of the present disclosure.

The stationary charging coil is accompanied by circuitry for wire fast charging. The power wire 5 is attached to the low voltage wire 8, which inputs a low voltage into the DC/DC switching controller 9. The low voltage input into the DC/DC switching controller 9 for wire fast charging may be lower than a voltage input into the power stage/controller 3 and control IC 4 for wireless charging.

The DC/DC switching controller 9 is connected to a feedback mechanism 10 for receiving feedback from a USB fast charging controller 11, which is also connected to the DC/DC switching controller 9. The DC/DC switching controller 9 may convert a low voltage input from the low voltage wire to a higher voltage. Alternatively, the DC/DC switching controller 9 may convert the input voltage to a lower voltage. The feedback mechanism 10 provides feedback information from the USB fast charging controller 11 to the DC/DC switching controller 9. The feedback information may include real-time operating conditions of the USB fast charging controller 11, and may supply information to the DC/DC switching controller 9 to regulate voltage conversion.

The low voltage wire 8, DC/DC converter 9, feedback signal device 10, USB charging controller 11, and the USB socket 12 may be housed in the case 1, with the coil 2, the power stage/controller 3, and the control IC 4.

The USB fast charging controller 11 is directly connected to the USB socket 12 and provides an electrical signal to the USB socket 12. An external electronic device may be charged through the USB socket 12.

Figure 3:
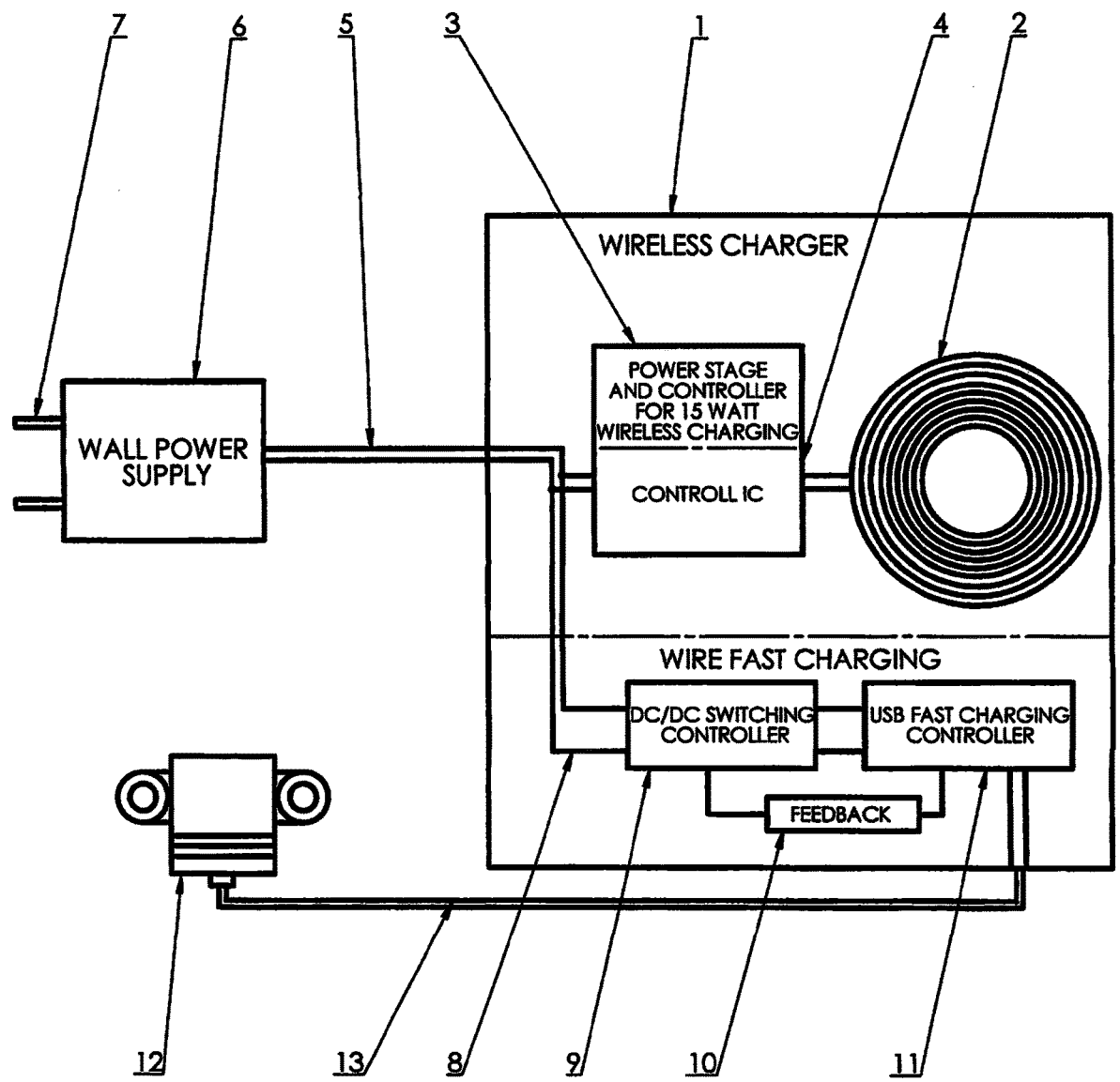
FIG. 3 shows a diagram illustrating a stationary charging coil with an external USB port, according to an embodiment of the present disclosure.

Referring to FIG. 3, a diagram is provided that illustrates a stationary charging coil with an external USB port, according to an embodiment of the present disclosure.

In the stationary charging coil with an external USB port, the USB fast charging controller 11 is connected to the USB socket 12 by the USB wire 13. The USB wire 13 provides an electrical signal from the USB fast charging controller 11 to the USB socket 12. An external electronic device may be charged through the USB socket 12.

Additionally, the USB socket 12 may include a custom IC to communicate with an IC of an external device (i.e., the main IC of a mobile phone) while charging. The external IC may communicate real-time charging specification information, such as power, voltage, and amperage levels to the USB fast charging controller 11 through the USB socket 12.

Figure 4:
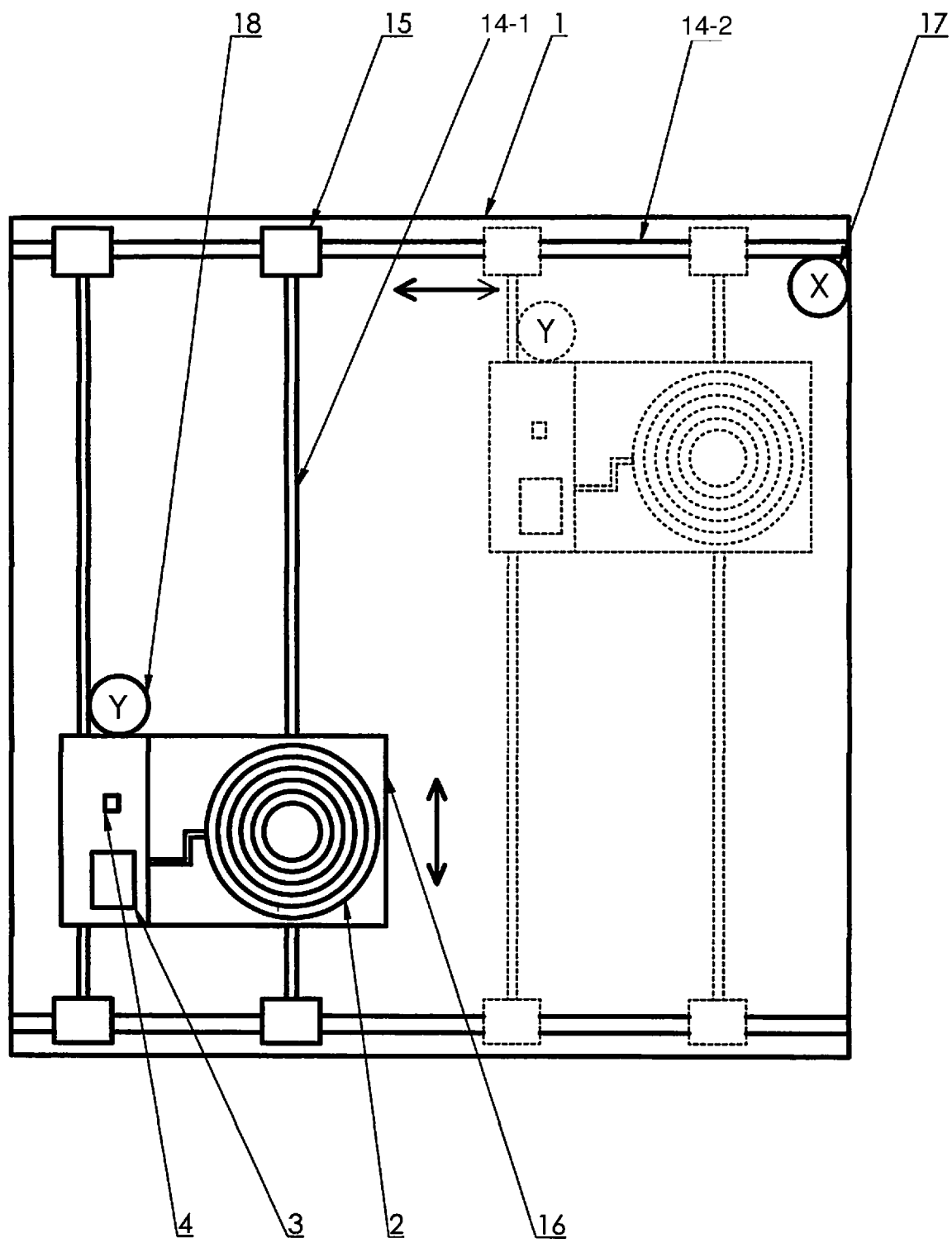
FIG. 4 shows a diagram illustrating a movable charging coil, according to an embodiment of the present disclosure.
Figure 5:
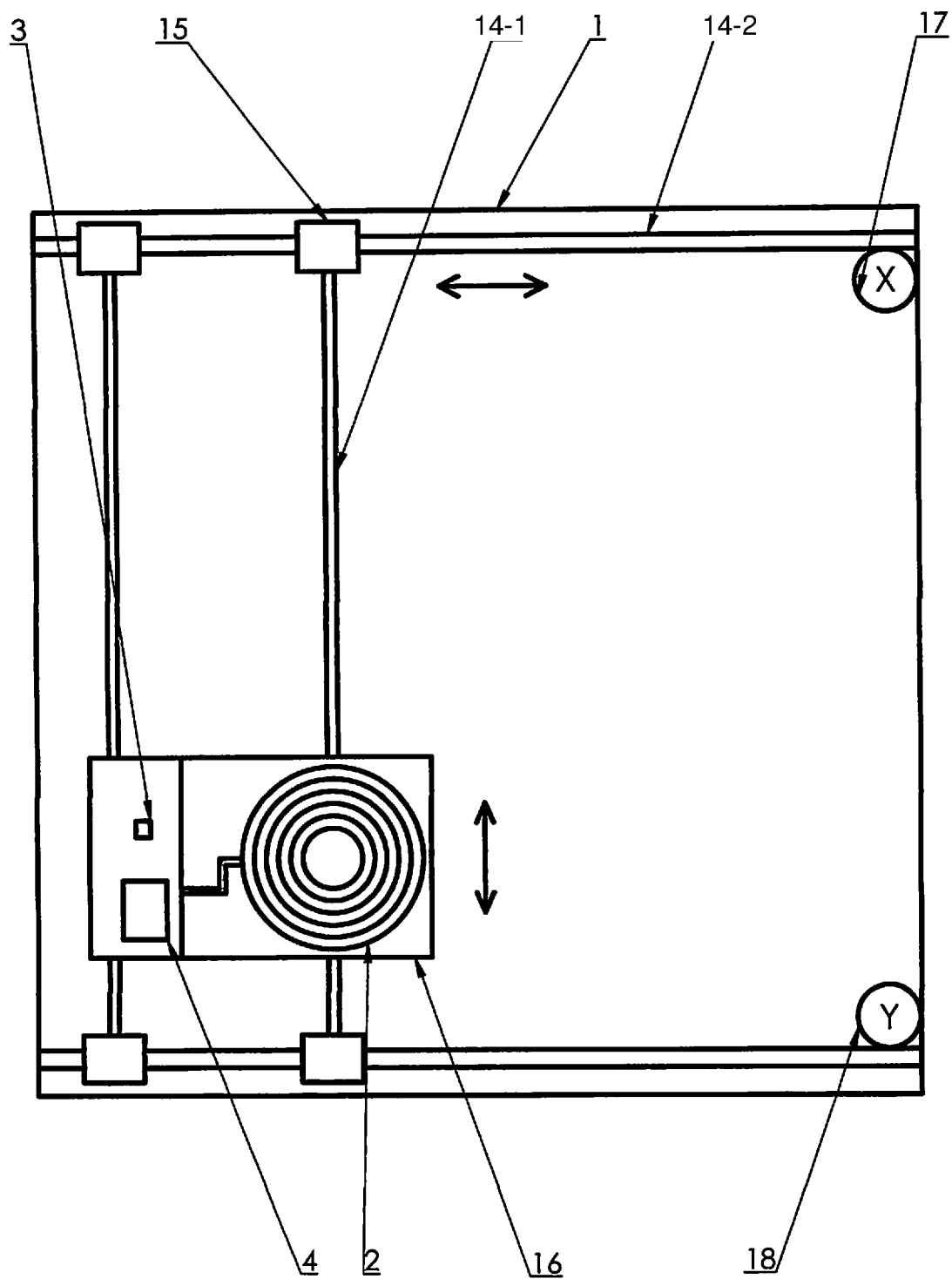
FIG. 5 shows a diagram illustrating a movable charging coil, according to an embodiment of the present disclosure.
Figure 6:
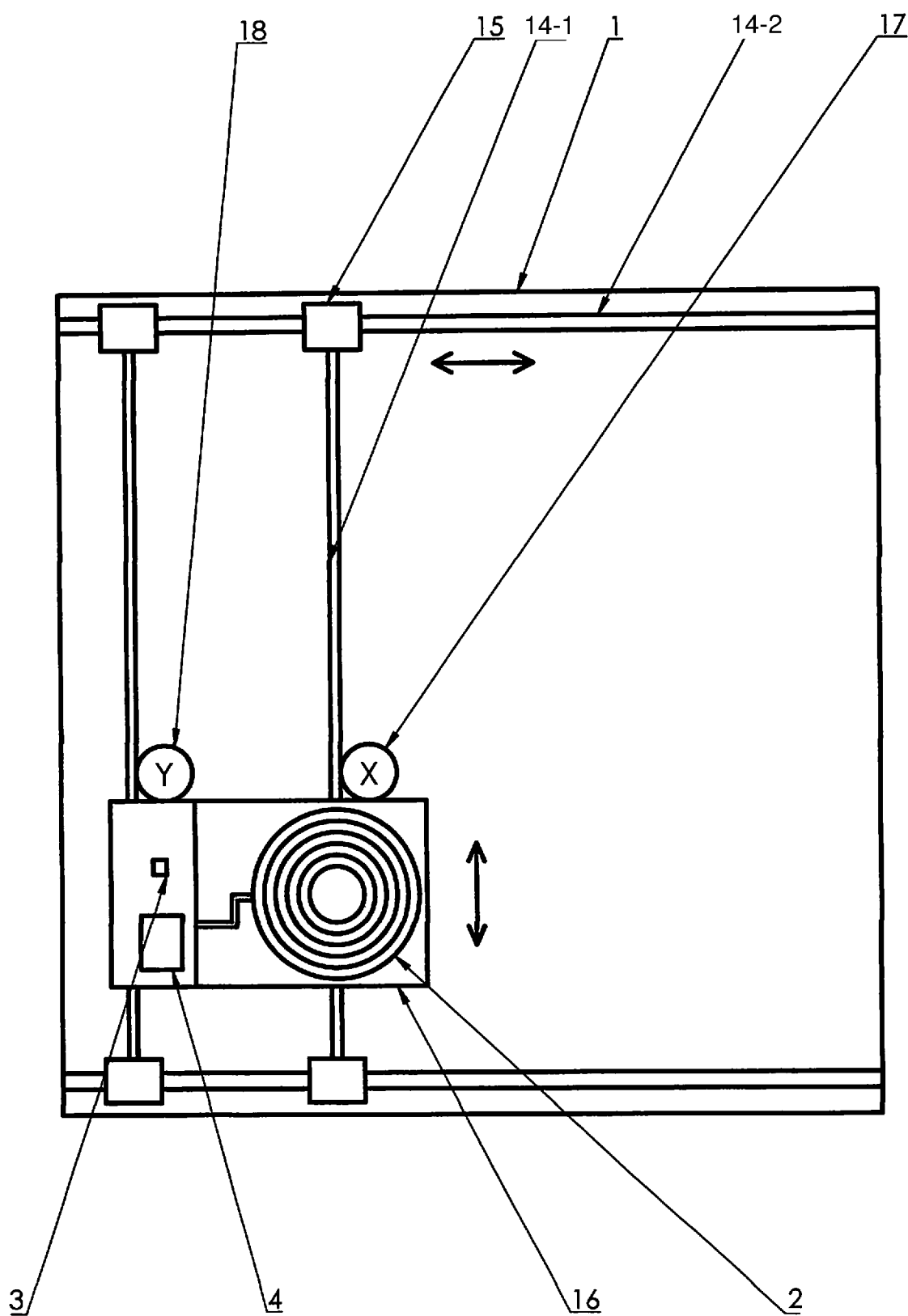
FIG. 6 shows a diagram illustrating a movable charging coil, according to an embodiment of the present disclosure.

Referring to FIGS. 4-6, diagrams are provided that illustrate a movable charging coil, according to embodiments of the present disclosure.

A movable charging coil may be placed inside of furniture to enable an external electronic device to be placed outside (i.e., on top of) the furniture to be charged. In other words, an area in which the electronic device can be wirelessly charged is large because the movable charging coil may adjust its position to accommodate the location of the electronic device.

The case 1 for the movable charging coil 2 may house a slider 14, bearings 15, a wireless base 16, an X axis motor 17, and a Y axis motor 18.

Further, the case 1 may have multiple uses. For example, the case 1 may be the top side of a desk, or a part of a couch (i.e., a middle section, a side section, or an ottoman). The present embodiment is directed to any adaptation of the case 1, so long as it is capable of performing the functions of the movable charging coil, as will be discussed.

The case 1 includes a plurality of sliders 14-1 and 14-2 that are oriented in vertical and horizontal positions, or along the Y and X axes, respectively. The ends of the vertical sliders 14-1 are connected to bearings 15 that form a movable joint along the horizontal sliders.

The wireless base 16 may be a platform that is attached to the wireless coil 2, power stage/controller 3, and controller IC 4. The wireless base 16 is not fixed relative to the case 1. Thus, the wireless base 16 is movable inside of the case 1 and is stationary with respect to the coil 2.

The wireless base 16 may be moved in a horizontal direction by an X axis motor 17, and may be moved in a vertical direction by a Y axis motor 18.

As shown in FIG. 4, the X axis motor 17 may be positioned inside of the case 1 but not on the wireless base 16. The Y axis motor 18 may be positioned to be affixed to the wireless base 16. Thus, the Y axis motor 18 may move with the wireless base 16 and the X axis motor 17 may not.

The Y axis motor 18 controls the movement of the wireless base 16 in the vertical direction. The X axis motor 17 controls the movement of the wireless base 16 in the horizontal direction. Thus, the wireless base 16, including the coil 2, can be moved in two dimensions to perform wireless charging on an external electronic device. Additionally, a Z axis motor may be implemented above or below the wireless base 16 to raise or lower the wireless coil 2.

Accordingly, a device to be charged (i.e., a mobile phone or tablet) may be placed on top of the case 1 and the motors may be used to adjust the position of the wireless base 16 so that the coil 2 is positioned near (i.e., beneath) the device to be charged.

The position of the device to be charged may be determined based on the strength of a signal received by the device to be charged. For example, the coil 2 may transmit wireless power to the device to be charged, and the controller IC 4 may determine a first power level based on a first signal strength of the wireless power received by the device to be charged. Next, the motors may move the wireless base 16 in a direction and transmit wireless power to the device to be charged, and the controller IC 4 may determine a second power level based on a second signal strength of the wireless power received by the device to be charged. If it is determined that the second power level based on the second signal strength is greater than the first power level based on the first signal strength, then the controller IC 4 may determine that device to be charged is located in the direction in which the wireless base 16 was moved towards. If the second signal strength is less than the first power level based on the first signal strength, then the controller IC 4 may determine that device to be charged is not located in the direction in which the wireless base 16 was moved towards.

Alternatively, the position of the device to be charged may be determined according to the strength of a bluetooth signal, according to a tuning frequency, or by using sensors (i.e., position sensors that detect weight) embedded in the case 1.

Referring to FIG. 5, the Y axis motor 18 may be positioned inside the case 1 but not affixed to the wireless base 16. In this embodiment, the Y axis motor 18 still controls the movement of the wireless base 16 in the vertical direction but is not affixed to the base 16.

Referring to FIG. 6, the X axis motor 17 and the Y axis motor 18 may be positioned to be affixed to the wireless base 16. In this embodiment, the X axis motor 18 still controls the movement of the wireless base 16 in the horizontal direction and is affixed to the base 16.

Figure 7:
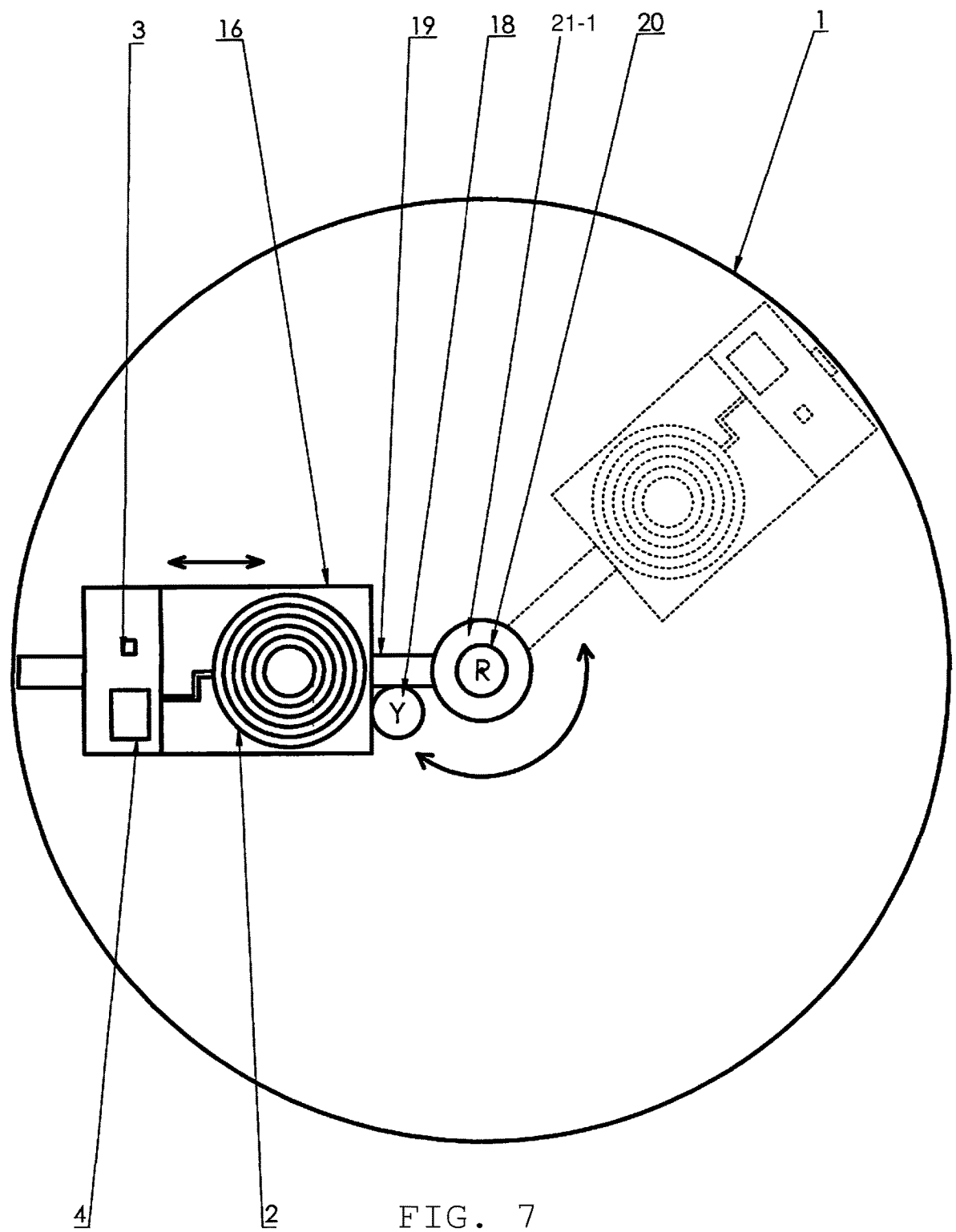
FIG. 7 shows a diagram illustrating a movable charging coil, according to an embodiment of the present disclosure.
Figure 8:
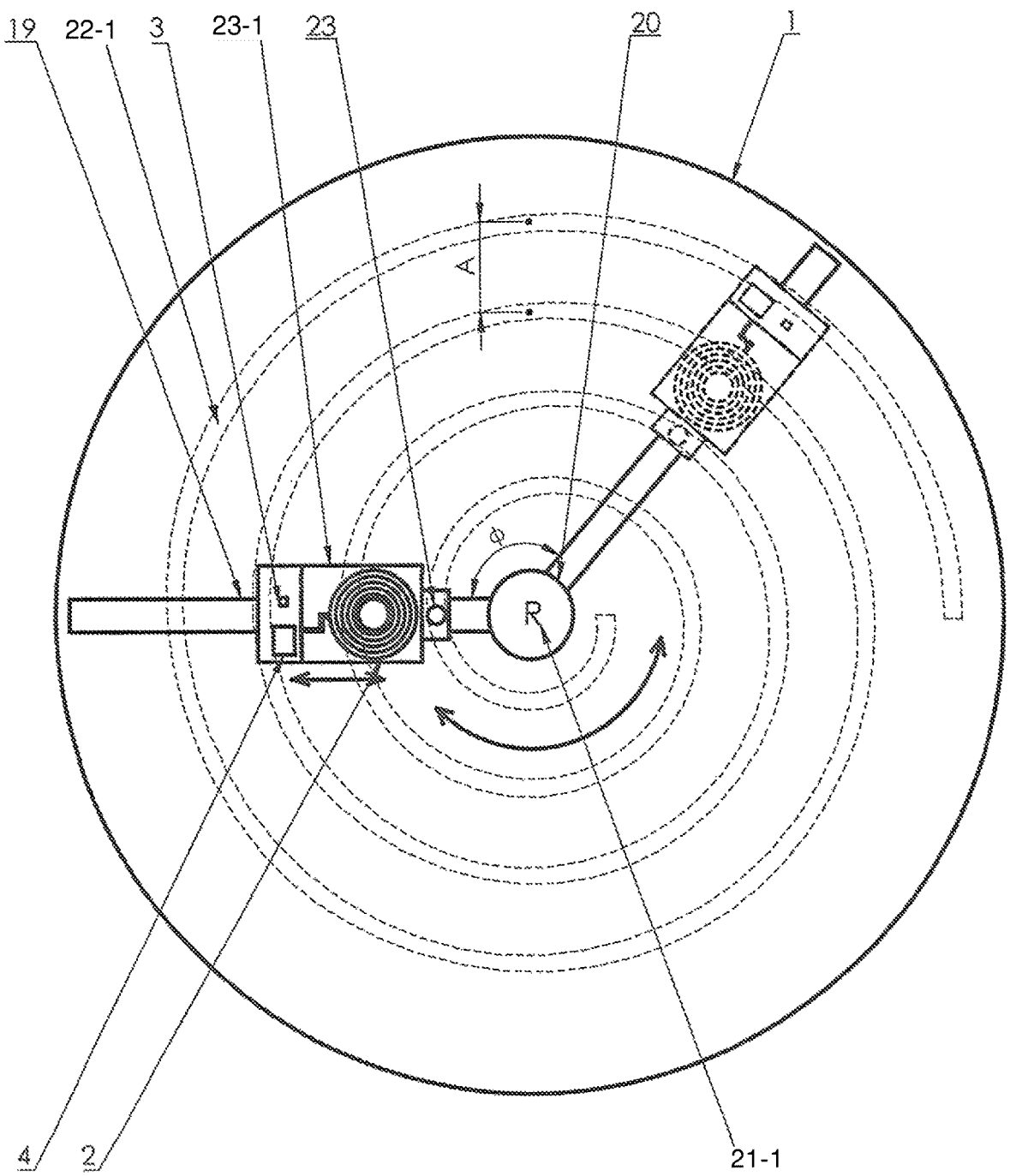
FIG. 8 shows a diagram illustrating a movable charging coil, according to an embodiment of the present disclosure.

Referring to FIGS. 7-8, diagrams are provided that illustrate a movable charging coil, according to embodiments of the present disclosure.

Referring to FIG. 7, the case 1 is a circular shape. The wireless base 16 is positioned on a radial arm 19 that extends from the outer edge of the case 1 to the center of the case 1 where a rotate motor 20 is positioned. One end of the radial arm 19 is fixed to the rotor bearing 21-1, which is connected to the rotate motor 20. The rotate motor 20 may move the radial arm 19 360 degrees about the rotate motor 20 by using the rotor bearing 21-1. Additionally, the Y axis motor 18 is positioned on the wireless base 16 and may move the wireless base 16 in a radial direction along the length of the radial arm 19.

Additionally, a Z axis motor may move the wireless base in an upward and downward direction.

Referring to FIG. 8, the case 1 further includes a spiral track 22-1 and a spiral pin 23-1. The spiral pin 23-1 connects the spiral track 22-1 to the radial arm 19 and may be movable along the spiral track 22-1 so that the wireless base 16 may rotate along the spiral track 22-1.

The spiral track 22-1 extends outward from the center of the case 1 towards the outer edge of the case 1. The spiral track 22-1 is shaped like a spiral that has a fixed width A in the radial direction.

Additionally, a Z axis motor may move the wireless base in an upward and downward direction.

While the disclosure has been shown and described with reference to a certain preferred embodiment thereof, it will be understood by those skilled in the art that various changes in form and details may be made therein without departing from the spirit and scope of the disclosure.

What is claimed:

1. A charging device comprising:
a wireless base;
a first motor positioned on the wireless base; and
a case attached to the wireless base, the case housing a wireless charging coil, a controller integrated circuit (IC), and a power stage controller,
wherein the controller IC is connected to the wireless charging coil and configured to:
determine a frequency characteristic of the wireless charging coil; and
control the power stage controller to supply a predetermined current to the wireless charging coil based on the frequency characteristic of the coil and an input power value,
wherein the first motor positioned on the wireless base is configured to move the wireless base and the first motor from a first position inside the charging device to a second position inside the charging device.

2. The charging device of claim 1, further comprising a second motor,
wherein the second motor is configured to move the wireless base and the first motor from the first position to the second position.

3. The charging device of claim 2, wherein the second motor is attached to the wireless base.

4. The charging device of claim 2, wherein the second motor is positioned inside the charging device but is not attached to the wireless base.

5. The charging device of claim 2, wherein the first motor is configured to move the wireless base in a first direction and the second motor configured to move the wireless base in a second direction perpendicular to the first direction.

6. The charging device of claim 5, wherein the first motor is attached to the wireless base and the second motor is not attached to the wireless base.

7. The charging device of claim 1, wherein the controller IC is configured to determine the second position according to a strength of a signal transmitted from an external device.

8. The charging device of claim 7, wherein the second position is closer to the external device than the first position.

9. The charging device of claim 1, further comprising a universal serial bus (USB) socket for USB fast charging.

10. The charging device of claim 1, further comprising a plurality of sliders, upon which the wireless base is configured to move.

11. The charging device of claim 10, wherein a first set of the plurality of sliders are positioned in a first direction and a second set of the plurality of sliders are positioned in a second direction perpendicular to the first direction, and
wherein an end of the first set of the plurality of sliders is connected to a bearing that forms a movable joint along the second set of sliders.

12. The charging device of claim 1, further comprising a rotor bearing positioned at a center portion of the charging device.

13. The charging device of claim 12, further comprising a second motor attached to the rotor bearing.

14. The charging device of claim 13, further comprising a radial arm extending from an outer edge of the charging device having one end fixed to the rotor bearing,
wherein the second motor is configured to rotate the radial arm 360 degrees about the center portion of the charging device.

15. The charging device of claim 14, wherein the first motor is configured to move the wireless base in a radial direction along the radial arm.

16. The charging device of claim 1, further comprising:
a spiral track extending outward from a center portion of the charging device; and
a spiral pin configured to connect the spiral track to a radial arm extending from an outer edge of the charging device to the center portion of the charging device.

17. The charging device of claim 12, wherein the controller IC is configured to determine the second position according to a strength of a signal transmitted from an external device.

18. The charging device of claim 17, wherein the second position is closer to the external device than the first position.

19. A charging device comprising:
a wireless base;
a first motor positioned on the wireless base; and a case attached to the wireless base, the case housing a wireless charging coil, a controller integrated circuit (IC), and a power stage controller;

wherein the controller IC is connected to the wireless charging coil and configured to determine a frequency characteristic of the wireless charging coil, and control the power stage controller to supply a predetermined current to the wireless charging coil based on the frequency characteristic of the coil and an input power value;

a first set of sliders positioned in a horizontal direction; and a second set of sliders positioned in a vertical direction and connected to bearings that form a movable joint along the first set of sliders, wherein the first motor positioned on the wireless base is configured to move the wireless base and the first motor along at least one of the first set of sliders and the second set of sliders from a first position inside the charging device to a second position inside the charging device.

20. A charging device comprising:

a wireless base;

a wireless charging coil attached to the wireless base;

a controller integrated circuit (IC) connected to the wireless charging coil;

a rotor bearing positioned at a center portion of the charging device;

a radial arm extending from an outer edge of the charging device to the center portion of the charging device;

a rotate motor configured to rotate the radial arm 360 degrees about the center portion of the charging device; and a linear motor configured to move the wireless base in a radial direction along the radial arm, wherein the wireless base is configured to move from a first position inside the charging device to a second position inside the charging device.

* * * * *